US011969763B2

(12) United States Patent
Kim et al.

(10) Patent No.: US 11,969,763 B2
(45) Date of Patent: Apr. 30, 2024

(54) SYSTEM FOR AUTOMATICALLY INSPECTING AND SORTING PELLETS

(71) Applicant: LG Chem, Ltd., Seoul (KR)

(72) Inventors: Hyun Tae Kim, Osan-si (KR); Worl Yong Kim, Osan-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/024,121

(22) PCT Filed: Aug. 3, 2021

(86) PCT No.: PCT/KR2021/010114
§ 371 (c)(1),
(2) Date: Mar. 1, 2023

(87) PCT Pub. No.: WO2022/050579
PCT Pub. Date: Mar. 10, 2022

(65) Prior Publication Data
US 2024/0024922 A1 Jan. 25, 2024

(30) Foreign Application Priority Data
Sep. 2, 2020 (KR) ........................ 10-2020-0111726

(51) Int. Cl.
*B07C 5/342* (2006.01)
*B07C 5/36* (2006.01)

(52) U.S. Cl.
CPC .............. *B07C 5/342* (2013.01); *B07C 5/362* (2013.01)

(58) Field of Classification Search
CPC ................................ B07C 5/342; B07C 5/362
See application file for complete search history.

(56) References Cited

U.S. PATENT DOCUMENTS

2011/0030314 A1 2/2011 Baroncini
2011/0297590 A1* 12/2011 Ackley .............. G01N 21/8806 209/552
2020/0300748 A1 9/2020 Bremer

FOREIGN PATENT DOCUMENTS

KR 100997858 B1 12/2010
KR 20100130995 A 12/2010
KR 20120054834 A 5/2012
(Continued)

OTHER PUBLICATIONS

International Search Report for Application No. PCT/KR2021/010114 dated Nov. 2, 2021, 2 pages.

*Primary Examiner* — Jacob S. Scott
*Assistant Examiner* — Miraj T. Patel
(74) *Attorney, Agent, or Firm* — Lerner David LLP

(57) ABSTRACT

A system for automatically inspecting and sorting pellets while continuously transferring the pellets at a high speed to detect and effectively remove pellets that are defective. The system includes a sorter to photograph and inspect a first surface and a second surface of each of the pellets while transferring the pellets. The system separates and removes pellets that are determined as being defective and transfers and loads pellets having good quality to a designated position. The system further includes a sample inspector to receive the plurality of pellets that are determined as good products to manufacture a plate-shaped sample of a molded product and photograph a first surface and a second surface of the manufactured sample, thereby inspecting whether the sample of the molded product is defective.

15 Claims, 10 Drawing Sheets

(56) References Cited

FOREIGN PATENT DOCUMENTS

| | | | |
|---|---|---|---|
| KR | 20140094709 | A | 7/2014 |
| KR | 20190010589 | A | 1/2019 |
| KR | 102009757 | B1 | 8/2019 |
| KR | 20200057317 | A | 5/2020 |
| KR | 102137362 | B1 | 7/2020 |

* cited by examiner

FIG.11

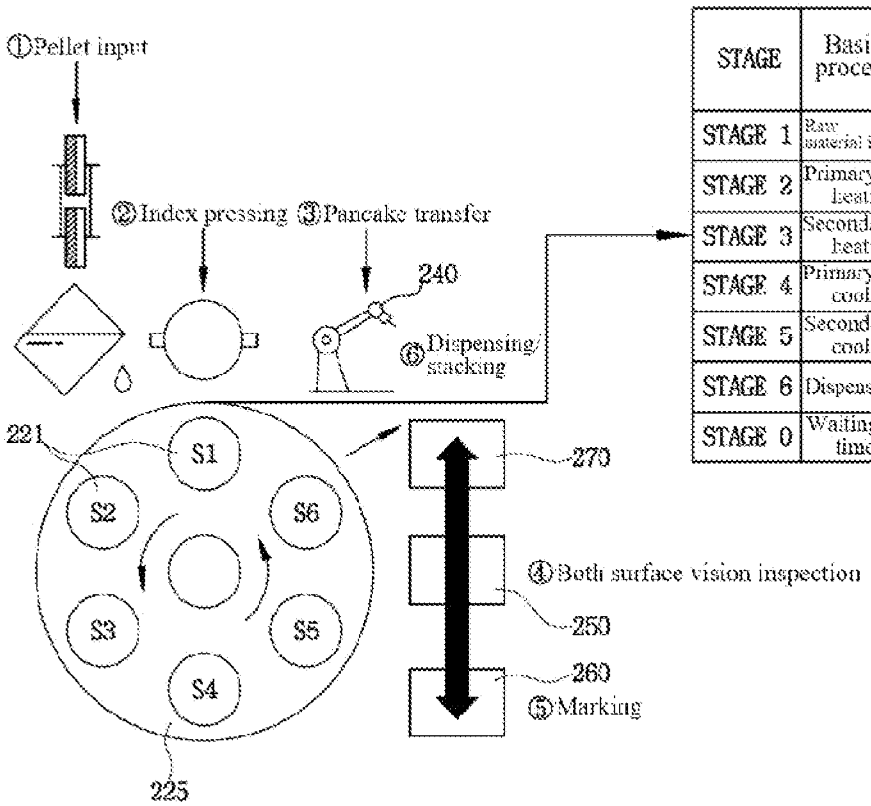

| STAGE | Basic process | Additional process | Mold | | Temperature classification |
|---|---|---|---|---|---|
| | | | Upper core | Lower core | |
| STAGE 1 | Raw material input | Hot wind | OPEN | CLOSE | Heating |
| STAGE 2 | Primary heating | | CLOSE | CLOSE | |
| STAGE 3 | Secondary heating | | CLOSE | CLOSE | |
| STAGE 4 | Primary cooling | AIR cooling | CLOSE | CLOSE | Cooling |
| STAGE 5 | Secondary cooling | AIR cooling | CLOSE | CLOSE | |
| STAGE 6 | Dispensing | Vacuum adsorption | OPEN | CLOSE | Heating |
| STAGE 0 | Waiting time | | CLOSE | CLOSE | |

SYSTEM FOR AUTOMATICALLY INSPECTING AND SORTING PELLETS

CROSS-REFERENCE TO RELATED APPLICATIONS

The present application is a national phase entry under 35 U.S.C. § 371 of International Application No. PCT/KR2021/010114 filed on Aug. 3, 2021 which claims priority from Korean Patent Application No. 10-2020-0111726, filed on Sep. 2, 2020, all contents of which are incorporated herein by reference.

TECHNICAL FIELD

The present disclosure relates to an apparatus for inspecting whether pellets are defective, and more particularly, to a system for automatically inspecting and sorting pellets, which detects colors of pellets while continuously transferring a number of pellets to determine whether the pellets are defective and remove the pellets determined as being defective from a transfer path, thereby collecting only good quality pellets.

BACKGROUND ART

Pellets, which are solid particles of a synthetic resin that represents petrochemicals, are widely used in various fields such as films, pipes, and automobile interior materials. Since the pellets that are raw materials have a significant influence on quality of a final product, quality control and impurity control are very important. Particularly, in a manufacturing process, since unexpected different colors such as black, yellow, red, or other colors occur, or defective pellets having foreign substances attached or mixed with non-pellet substances, abnormal shapes having sizes or shapes out of a dimensional range, black spots due to carbonization or foreign substance of raw materials or subsidiary materials, and the like occur, it is necessary to sort and remove foreign particles.

According to the related art, when producing pellets, which are raw materials for synthetic resin injection molding, a pellet sorting device capable of sorting only standardized pellets is used to manufacture synthetic resin injection molding products that require precision. The pellet sorting device according to the related art is designed so that the pellets are formed from an extruder and supplied to a hopper through a discharge line, a screen mesh is installed at a lower portion of the hopper, and low-frequency vibration is applied to sort only the standardized pellets.

However, in a sorting method using the screen mesh, since the pellets are sorted depending on a shape and size of the mesh, the sorting is deteriorated in precision. In addition, it is impossible to sort pellets containing defects such as different colors, foreign substances, abnormal shapes, and dark spots, and thus, the pellets have be measured by an additional method, and also, since a size of each pellet is small, and an amount of processing that needs to be processed per hour is 1,200 kg per hour, about 4 million or more have be inspected, and since a production speed per pellet is 40 mm/sec, there is a limit to solving quality problems.

In addition, an 'artificial intelligence program-based foreign material sorting device' that acquires an original image using a camera while transferring an object containing a plurality of pellets, converts the original image into a preset size, and discriminates normal and abnormal pellets using the converted image, is disclosed in Korean Patent Registration No. 10-2009757.

However, the pellet sorting device including the conventional foreign matter sorting device is a color and foreign matter sorting device for a large circular object such as a bean rather than a hexahedral shape such as a pellet. For circular objects, even if the camera is positioned to view from both sides, there is an advantage because the image mapping section is minimized, but there is a minimal imaging range due to depth issues, which has limitations in detecting defects except for the inner most portion. Additionally, since it is not possible to acquire color information from both sides of pellets, there is a limit to detecting defects.

DISCLOSURE

Technical Problem

An object of the present technology for solving the above problem is to provide a system for automatically inspecting and sorting pellets, which acquires colors and images on both surfaces of the pellets while continuously transferring the pellets at a high speed to detect different colors, foreign substances, abnormal shapes, dark spots, and the like and effectively remove pellets that are determined as being defective while transferring the pellets, thereby improving accuracy and efficiency of pellet inspection and sorting operations.

Another object of the present technology is to provide a system for automatically inspecting and sorting pellets, which manufactures a sample of a molded product for pellets classified as good products to detect whether the sample is defective, thereby further improving accuracy and efficiency of inspecting and sorting the pellets.

Technical Solution

A system for automatically inspecting and sorting pellets according to an embodiment of the present invention for achieving the above object includes: a pellet supply part configured to supply a plurality of pellets; a first pellet transfer part configured to transfer the pellets supplied from the pellet supply part forward from a rear side; a pellet delivery part disposed on a front end of the first pellet transfer part to transfer the pellets transferred through the first pellet transfer part downward; a second pellet transfer part disposed below the first pellet transfer part to receive the pellets transferred downward through the pellet delivery part and turn the pellets upside down at an angle of 180° so as to transfer the pellets backward from a front side; a first vision inspection part disposed above the first pellet transfer part to photograph a first surface of each of the pellets so as to inspect whether the pellets are defective; a first dispensing part disposed in front of the first vision inspection part to suction the pellets that are determined as being defective by the first vision inspection part so as to separate the defective pellets from the first pellet transfer part; a second vision inspection part disposed above the second pellet transfer part to photograph a second surface of each of the pellets so as to inspect whether the pellets are defective; a second dispensing part disposed behind the second vision inspection part to suction the pellets that are determined as being defective by the second vision inspection part so as to separate the defective pellets from the second pellet transfer part; and an unloading part disposed on a rear end of the second pellet transfer part to receive the pellets transferred through the second pellet transfer part so as to transfer the pellets to a designated unloading position.

The first pellet transfer part may include: a first transfer plate which is installed to be inclined downward at a predetermined angle forward from the rear side and in which a plurality of lanes along which the pellets move extend in a front and rear direction; and a first vibration generator configured to vibrate the first transfer plate at a predetermined frequency, wherein the second pellet transfer part may include: a second transfer plate which is installed to be inclined downward at a predetermined angle backward from a front side and in which a plurality of lanes, in which the pellets are accommodated, extend in the front and rear direction; and a second vibration generator configured to vibrate the second transfer plate at a predetermined frequency.

Each of top surfaces of the first transfer plate and the second transfer plate may be coated with a light-absorbent resin to prevent diffused reflection in the photographing process of the first vision inspection part and the second vision inspection part.

The pellet supply part may include: a hopper configured so that an input port, into which the pellets are put, is formed to be opened; and at least one or more distribution plates which are disposed below the hopper and in which a plurality of pellet distribution holes, through which the pellets pass, are formed to be penetrated.

Each of the first dispensing part and the second dispensing part may include a plurality of vacuum suction nozzles arranged in a lateral direction above the first pellet transfer part and the second pellet transfer part, respectively, so that the vacuum suction nozzles are configured to suction the pellets, which are determined as being defective and are moved along the first pellet transfer part and the second pellet transfer part, and the pellets in a surrounding area of the defective pellets together so as to discharge the pellets to the outside.

A plurality of fine ventilation holes, each of which has a size less than that of each of the pellets, may be formed to vertically pass through the first pellet transfer part and the second pellet transfer part corresponding to the vacuum suction nozzle, and a discharge auxiliary blower configured to blow air through the fine ventilation holes is installed below the first pellet transfer part and the second pellet transfer part so that, when the process of discharging the defective pellets is performed by the vacuum suction nozzles, the discharge auxiliary blower operates to blow air upward through the fine ventilation holes to help the discharge of the pellets.

The pellet delivery part may include: a first guide plate installed to extend downward from a front end of the first pellet transfer part; a second guide plate installed to be spaced apart by a certain amount greater than a thickness of the pellet in front of the first guide plate; and a plurality of guide lanes formed to extend vertically between the first guide plate and the second guide plate so as to guide the pellets downward.

The system may further include: an upper transfer auxiliary blower installed to blow air between upper ends of the first guide plate and the second guide plate above a front end of the first pellet transfer part; and a lower transfer auxiliary blower installed to blow air backward from the front side at a lower end of the second guide plate to push the pellets transferred from the lower end of the second guide plate to the second pellet transfer part.

The first guide plate and the second guide plate may be installed to be inclined at an angle of 2° to 4° with respect to an axis perpendicular to the ground.

The unloading part may include: a good product transfer conveyor configured to transfer the pellets, which are determined as good products and are discharged through a rear end of the second pellet transfer part; an emergency discharge conveyor configured to transfer the pellets, which are determined as being defective and are discharged through the rear end of the second transfer plate; and a conveyor moving unit configured to transfer the good product transfer conveyor and the emergency discharge conveyor to positions corresponding to the rear end of the second pellet transfer part.

The system may further include a sample inspector configured to receive the pellets, which are determined as good products in the first vision inspection part and the second vision inspection part, at regular intervals through the first dispensing part or the second dispensing part so as to manufacture a plate-shaped sample of a molded product and configured to inspect whether the manufactured sample of the molded product is defective.

The sample inspector may include: a pellet storage part configured to receive the pellets through the first dispensing part or the second dispensing part; a sample molding part including a lower mold provided with a cavity in which a certain amount of pellets are recessed from the pellet storage part, an upper mold configured to press the pellets put into the cavity of the lower mold to manufacture a disk-shaped sample of a molded product, and a heater configured to transfer heat to the pellets through the lower mold and the upper mold so as to melt the pellets; a cooling part configured to cool the sample of the molded product manufactured in the sample molding part; a sample transfer robot configured to transfer the sample of the molded product cooled by the cooling part; a sample inspection part configured to photograph top and bottoms surfaces of the sample of the molded product transferred by the sample transfer robot so as to inspect whether the sample is defective; a marking part configured to mark a predetermined mark on a surface of the sample of the molded product, which is inspected by the sample inspection part; and a sample unloading stacker configured to load the sample of the molded product, which is marked in the marking part.

The sample molding part may include: an index table which is rotatably installed at a predetermined angle with respect to an axis perpendicular to the ground and on which a plurality of lower molds and upper molds are disposed at certain intervals in a circumferential direction; and an index vibration unit configured to vibrate the lower mold.

A system for automatically inspecting and sorting pellets according to another embodiment of the present invention includes: a sorter configured to photograph and inspect a first surface and a second surface of each of the pellets while transferring a plurality of pellets to separate and remove pellets that are determined as being defective and transfer and load pellets P having good quality to a designated position; and a sample inspector configured to receive the plurality of pellets that are determined as good products among the pellets sorted in the sorter to manufacture a plate-shaped sample of a molded product and photograph a first surface and a second surface of the manufactured sample of the molded product, thereby inspecting whether the sample of the molded product is defective.

The sorter may include: a pellet supply part configured to supply a plurality of pellets; a first pellet transfer part configured to transfer the pellets supplied from the pellet supply part forward from a rear side; a pellet delivery part disposed on a front end of the first pellet transfer part to transfer the pellets transferred through the first pellet transfer part downward; a second pellet transfer part disposed below the first pellet transfer part to receive the pellets transferred downward through the pellet delivery part and turn the pellets upside down at an angle of 180° so as to transfer the pellets backward from a front side; a first vision inspection part disposed above the first pellet transfer part to photograph a first surface of each of the pellets so as to inspect whether the pellets are defective; a first dispensing part disposed in front of the first vision inspection part to suction and discharge the pellets transferred by the first vision inspection part; a second vision inspection part disposed above the second pellet transfer part to photograph a second surface of each of the pellets so as to inspect whether the pellets are defective; a second dispensing part disposed behind the second vision inspection part to suction the pellets transferred by the second pellet transfer part; and an unloading part disposed on a rear end of the second pellet transfer part to receive the pellets transferred through the second pellet transfer part so as to transfer the pellets to a designated unloading position.

The sample inspector may include: a pellet storage part configured to receive the pellets from the sorter so as to store the pellets; a sample molding part including a lower mold provided with a cavity in which a certain amount of pellets are recessed from the pellet storage part, an upper mold configured to press the pellets put into the cavity of the lower mold to manufacture a disk-shaped sample of a molded product, and a heater configured to transfer heat to the pellets through the lower mold and the upper mold so as to melt the pellets; a cooling part configured to cool the sample of the molded product manufactured in the sample molding part; a sample transfer robot configured to transfer the sample of the molded product cooled by the cooling part; a sample inspection part configured to photograph top and bottoms surfaces of the sample of the molded product transferred by the sample transfer robot so as to inspect whether the sample is defective; a marking part configured to mark a predetermined mark on a surface of the sample of the molded product, which is inspected by the sample inspection part; and a sample unloading stacker configured to load the sample of the molded product, which is marked in the marking part.

The sample molding part may include: an index table which is rotatably installed at a predetermined angle with respect to an axis perpendicular to the ground and on which a plurality of lower molds and upper molds are disposed at certain intervals in a circumferential direction; and an index vibration unit configured to vibrate the lower mold.

Advantageous Aspects

According to an embodiment of the present invention, the colors and images of both the surfaces of the pellets may be acquired while the pellets are continuously transferred at the high speed in the sorter to detect the defects such as the different colors, the foreign substances, the abnormal shapes, and the dark spots, and the like, thereby removing the pellets that are determined as being defective while transferring the pellets. Therefore, a beneficial aspect may be to significantly improve the accuracy and efficiency of inspecting and sorting the pellets.

In addition, the sample of the molded product may be periodically manufactured for the pellets that are determined and classified as the good product in the sorter to detect whether the manufactured sample of the molded product is defective, thereby predicting and handling the accuracy of the sorting in the sorter and the possibility of the defects in the final product.

BRIEF DESCRIPTION OF THE DRAWINGS

FIG. 11 is a view illustrating an example of an operation of the sample inspector illustrated in FIG. 6.

DETAILED DESCRIPTION

Figure 1:
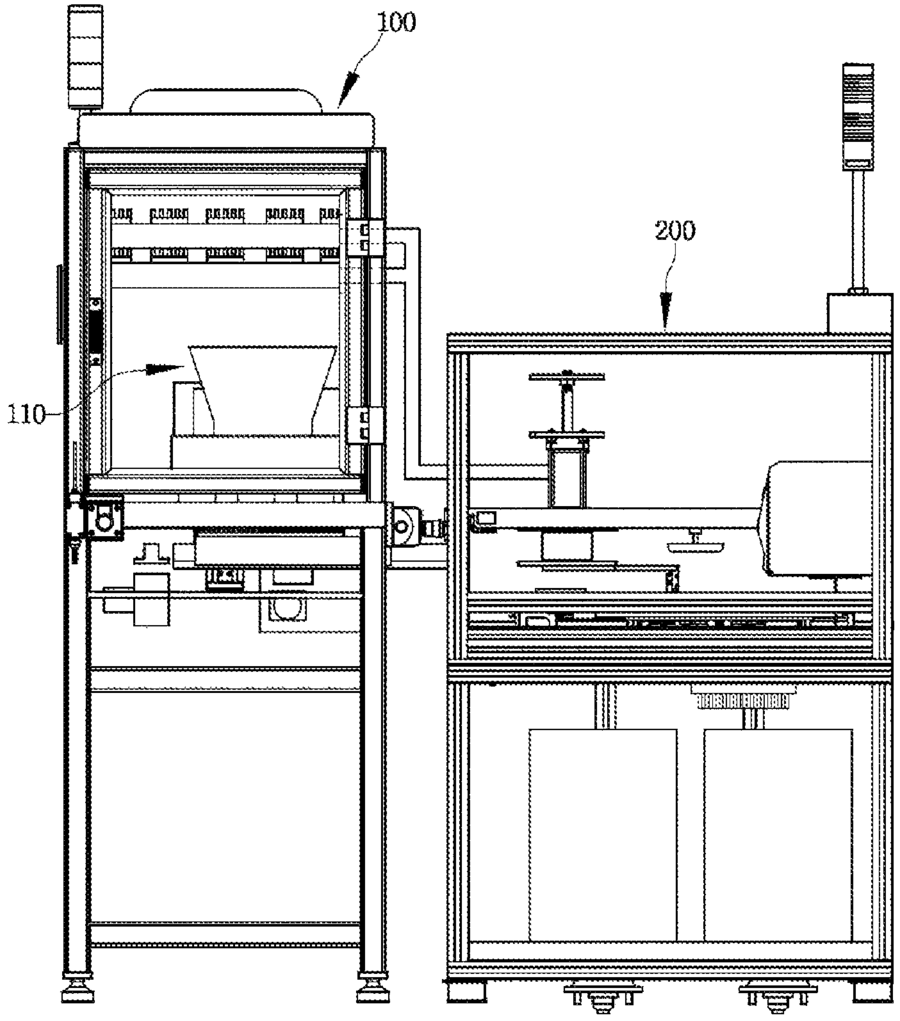
FIG. 1 is a front view illustrating a system for automatically inspecting and sorting pellets according to an embodiment of the present invention.
Figure 2:
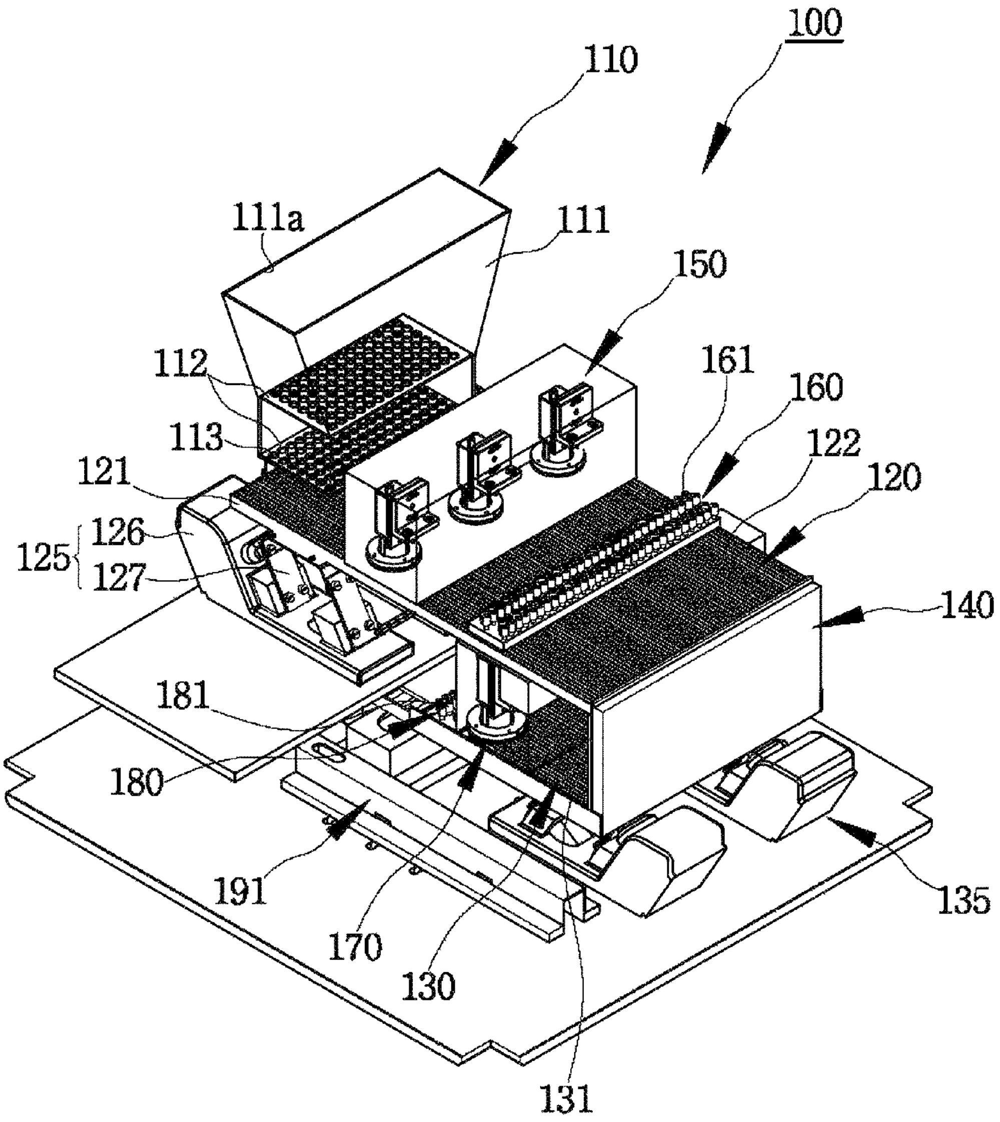
FIG. 2 is a perspective view illustrating a configuration of the system for automatically inspecting and sorting the pellets according to an embodiment of the present invention.
Figure 3:
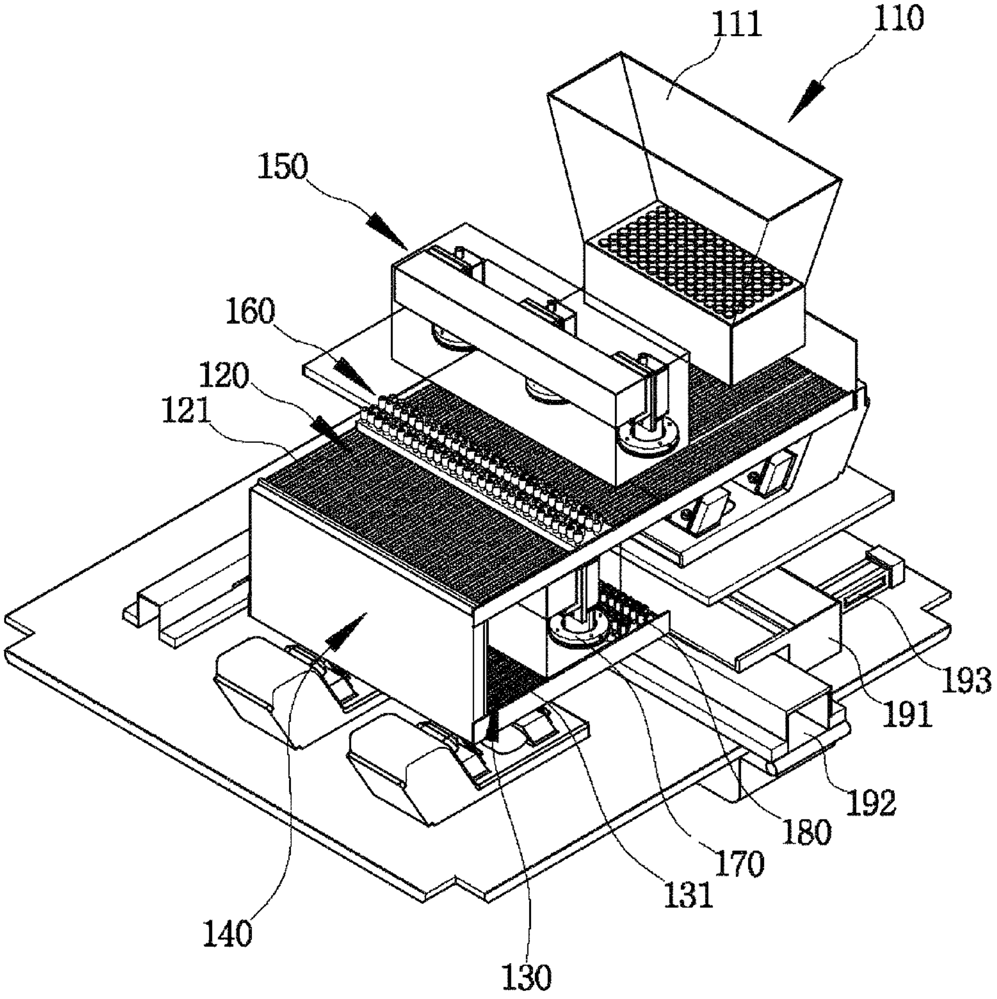
FIG. 3 is a perspective view illustrating a sorter illustrated in FIG. 2 when viewed in a different direction.
Figure 4:
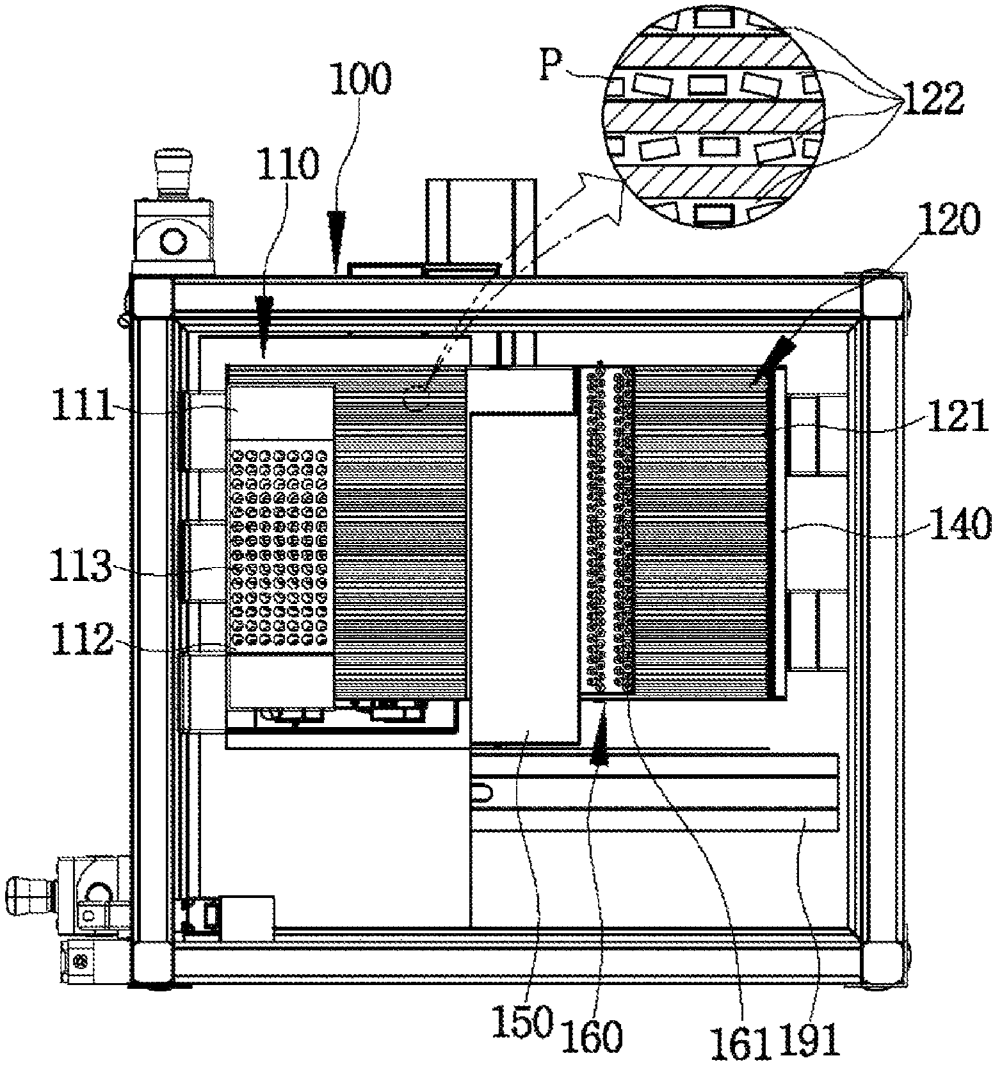
FIG. 4 is a plan view illustrating the sorter illustrated in FIG. 2.
Figure 5:
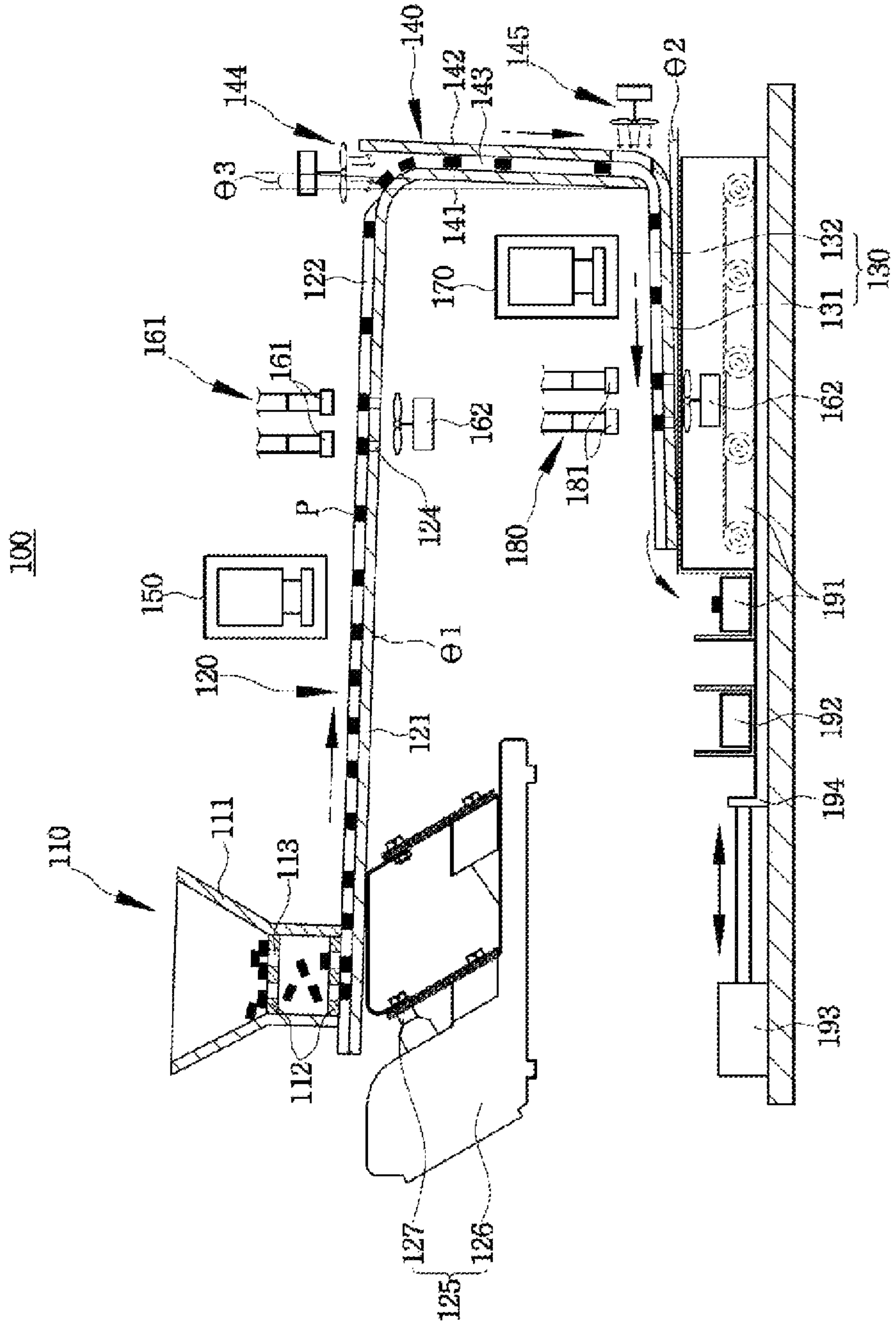
FIG. 5 is a cross-sectional view illustrating the sorter illustrated in FIG. 2.
Figure 6:
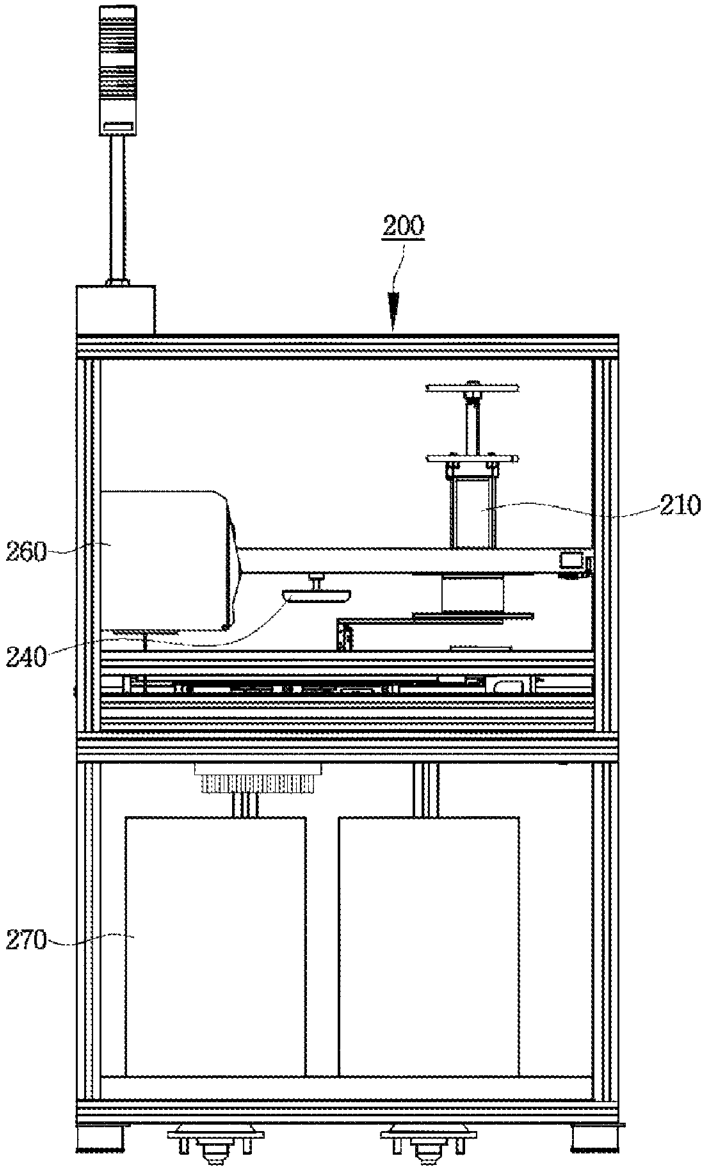
FIG. 6 is a front view illustrating a configuration of a sample inspector of the system for automatically inspecting and sorting the pellets according to an embodiment of the present invention.
Figure 7:
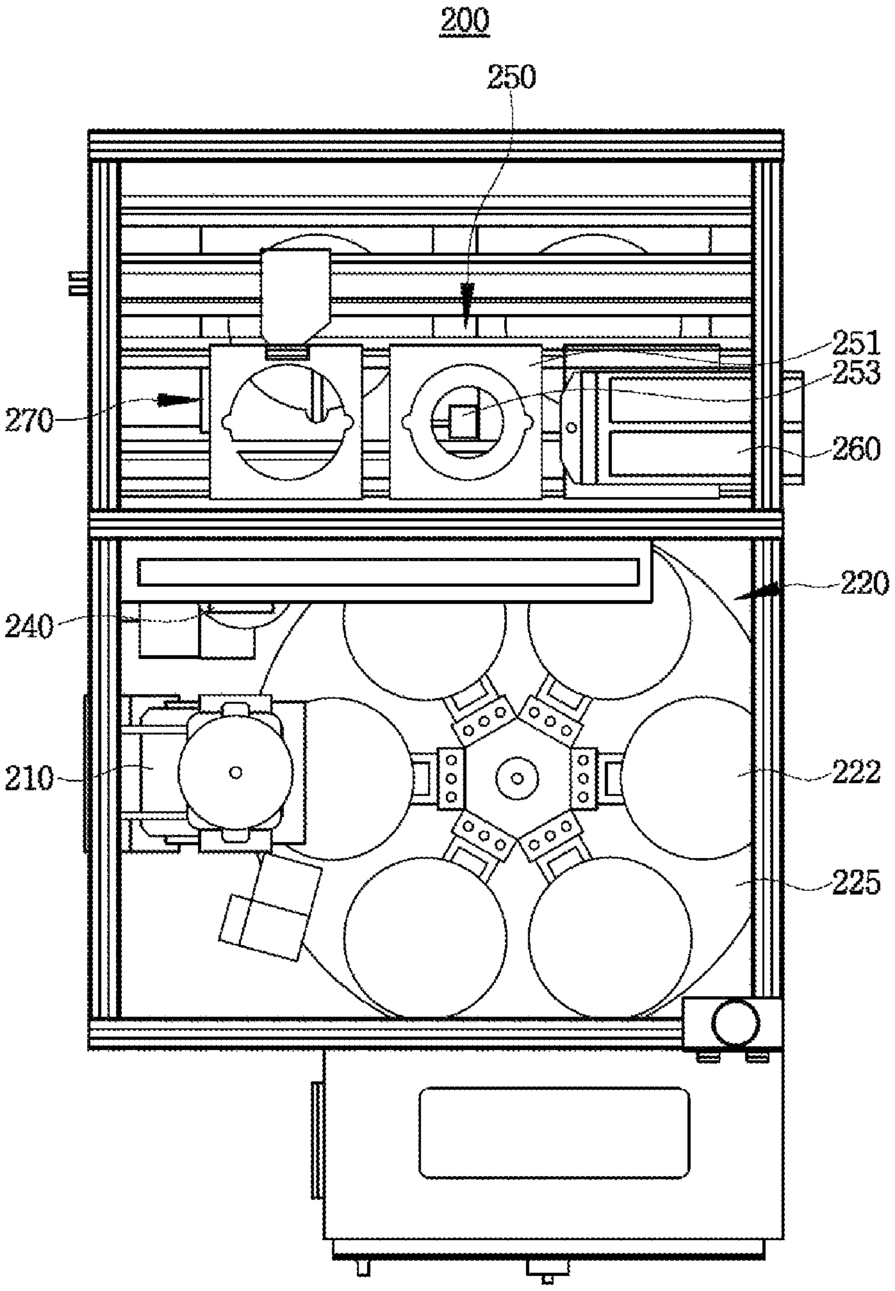
FIG. 7 is a plan view illustrating the sample inspector illustrated in FIG. 6.
Figure 8:
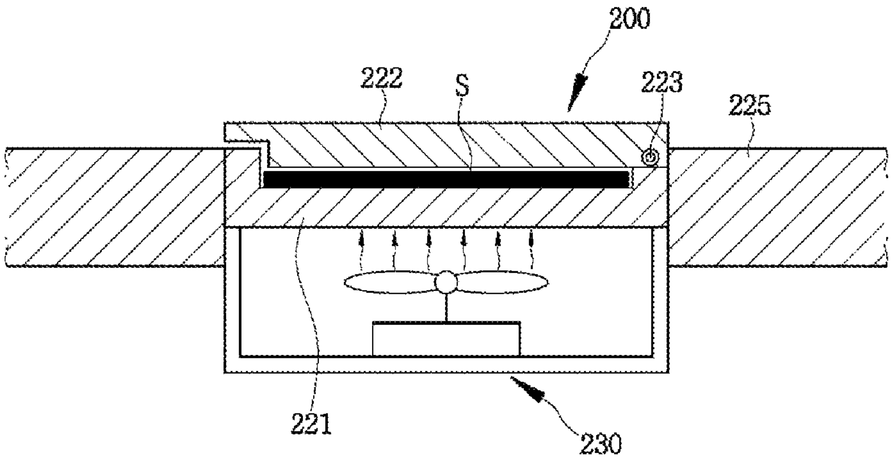
FIG. 8 is a cross-sectional view illustrating a sample molding part of the sample inspector illustrated in FIG. 6.
Figure 9:
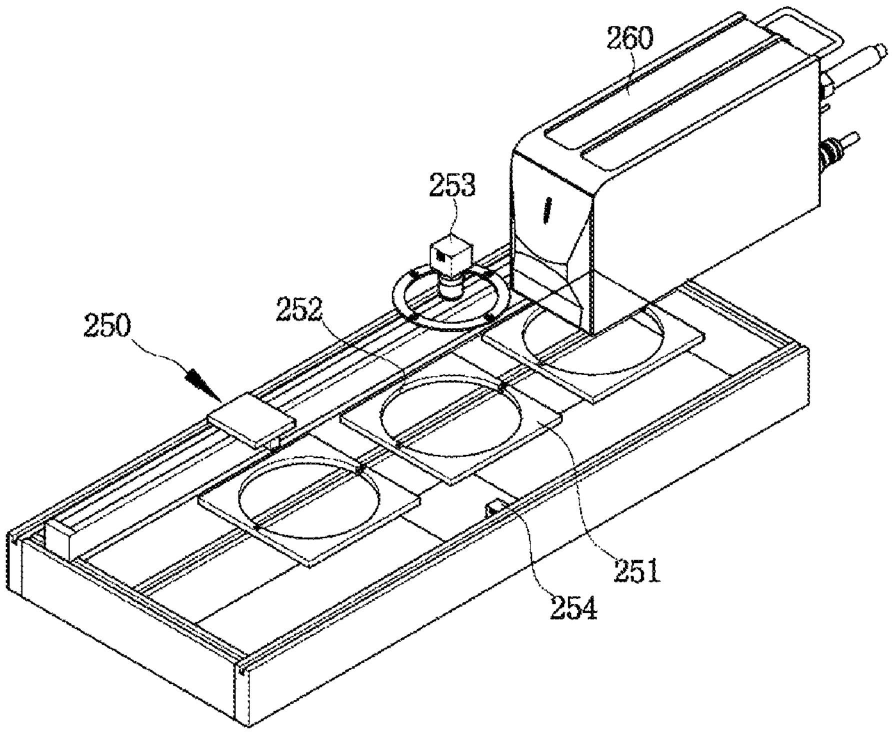
FIG. 9 is a perspective view illustrating a configuration of a portion of the sample inspector illustrated in FIG. 6.
Figure 10:
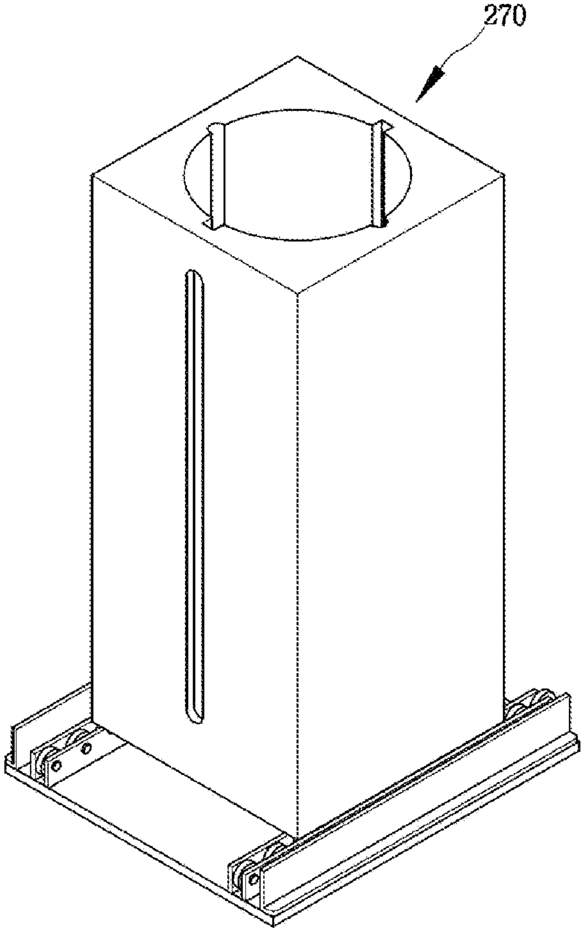
FIG. 10 is a perspective view illustrating a configuration of the other portion of the sample inspector illustrated in FIG. 6.

A system for automatically inspecting and sorting pellets according to embodiments of the present invention will be described in detail with reference to the accompanying drawings. Since the embodiments of the present invention may have various changes and various forms, specific embodiments are illustrated in the drawings and described in detail in the text. However, this does not limit the present invention within specific embodiments and it should be understood that the present invention covers all the modifications, equivalents, and replacements within the idea and technical scope of the inventive concept. In descriptions of each drawing, like reference numerals refer to like elements throughout. In the accompanying drawings, dimensions of structures are shown larger than actual structures for clarity, or smaller than actual structures in order to understand the schematic configuration.

Also, it will be understood that although the terms such as 'first' and 'second' are used herein to describe various elements, these elements should not be limited by these terms. These terms are used only to distinguish one component from other components. For example, a first element referred to as a first element in an embodiment can be referred to as a second element in another embodiment without departing from the scope of the appended claims. Unless defined otherwise, all terms used herein, including technical or scientific terms, have the same meaning as commonly understood by a person of ordinary skill in the art to which the present invention belongs. Terms such as terms that are generally used and have been in dictionaries should be construed as having meanings matched with contextual meanings in the art. In this description, unless defined clearly, terms are not ideally, excessively construed as formal meanings.

As illustrated in FIG. 1, a system for automatically inspecting and sorting pellets according to an embodiment of the present invention includes a sorter 100, which photographs and inspects a first surface and a second surface of each of the pellets while transferring a plurality of pellets P to separate and remove pellets P that are determined as being defective and transfer and load pellets P having good quality to a designated position, and a sample inspector 200 which receives the plurality of pellets that are determined as good products among the pellets sorted in the sorter 100 at regular intervals to manufacture a sample S of a molded product and then photograph a first surface and a second surface of the manufactured sample S of the molded product, thereby inspecting whether the sample S of the molded product is defective.

The sorter 100 is configured to acquire sizes, shapes, colors, and the like of the plurality of pellets produced by cutting a thermoplastic resin into a certain size after extruding and molding the thermoplastic resin into the form of a thin rod and determine whether the plurality of pellets are defective so as to sort the pellets into defective products and good products and discharge the pellets that are determined as the defective products. The types of defects of the pellets inspected by the sorter 100 include different colors that are deviated from a production quality standard, foreign substances attached or mixed with non-pellet substances, abnormal shapes having sizes and shape out of a dimensional range to be produced, black spots due to carbonization or foreign substance of raw materials or subsidiary materials, and the like.

Referring to FIGS. 2 to 5, the sorter 100 includes a pellet supply part 110 supplying a plurality of pellets, a first pellet transfer part 120 transferring the pellets P supplied from the pellet supply part 110 forward from a rear side, a pellet delivery part 140 disposed on a front end of the first pellet transfer part 120 to transfer the pellets transferred through the first pellet transfer part 120 downward, a second pellet transfer part 130 disposed below the first pellet transfer part 120 to receive the pellets P transferred downward through the pellet delivery part 140 and turn the pellets upside down at an angle of 180° so as to transfer the pellets backward from a front side, a first vision inspection part 150 disposed above the first pellet transfer part 120 to photograph a first surface (top surface) of each of the pellets P so as to inspect whether the pellets P are defective, a first dispensing part 160 disposed in front of the first vision inspection part 150 to suction and discharge the pellets inspected by the first vision inspection part 150, a second vision inspection part 170 disposed above the second pellet transfer part 130 to photograph a second surface of each of the pellets so as to inspect whether the pellets are defective, a second dispensing part 180 disposed in front of the second vision inspection part 170 to suction and discharge the pellets P inspected by the second vision inspection part 170, and an unloading part disposed on a rear end of the second pellet transfer part 130 to receive the pellets P transferred through the second pellet transfer part 130 so as to transfer the pellets P to a designated unloading position.

The pellet supply part 110 includes a hopper 111 configured so that an input port 111*a*, into which the pellets P are put, is formed to be opened at an upper end and having a wide upper portion and a narrow lower portion, and a plurality of distribution plates 112 disposed at intervals below the hopper 111 and having a plurality of pellet distribution holes 113 through which the pellets P pass vertically. Thus, when the plurality of produced pellets P are put through the input port 111*a* of the hopper 111, the pellets P are uniformly distributed to both sides through the pellet distribution holes 113 of the distribution plates 112 to drop onto a rear end of the first pellet transfer part 120 so as to be supplied.

The first pellet transfer part 120 includes a first transfer plate 121 installed to be inclined downward at an angle θ1 of approximately 2° to 4° forward from the rear side, and a first vibration generator 125 vibrating the first transfer plate 121 at a predetermined frequency to transfer the pellets P. A plurality of lanes 122 along which the pellets P move are formed on a top surface of the first transfer plate 121 to extend in a front and rear direction. Each of the lanes 122 has a groove extending in the front and rear direction of the first transfer plate 121, and the plurality of lanes 122 are continuously arranged in a left and right width direction of the first transfer plate 121. Each of the lanes 122 has a size slightly greater than that of each of the pellets P, and thus, the pellets P are transferred in a row through the lanes 122.

The first vibration generator 125 includes a plurality of support bars 127 having an inverted 'U' shape that supports the first transfer plate 121 at a lower portion of a rear end of the first transfer plate 121, and a vibration module 126 that vibrates the support bar 127 in a Z-axis direction, that is, in a vertical direction to vibrate the first transfer plate 121 at a frequency of 40 Hz to 440 Hz in a Z-axis direction so that the pellets P are transferred along the lanes 122 at a predetermined speed.

The second pellet transfer part 130 includes a second transfer plate 131 installed to be inclined downward at an angle θ2 of approximately 2° to 4° backward from a front side at a lower side of the first transfer plate 121 and provided with the plurality of lanes 122 in which the pellets P are accommodated In addition, the second pellet transfer part 130 includes a second vibration generator 135 that vibrates the second transfer plate 131 at a predetermined frequency.

The number of lanes 122 of the second transfer plate 131 is the same as the number of lanes 122 of the first transfer plate 121, and the second vibration generator 135 is substantially the same as the first vibration generator 125, and thus, the second transfer plate 131 is vibrated at a frequency of 40 Hz to 440 Hz in the Z-axis direction so that the pellets P are transferred backward from the front side along the lanes 122 at a predetermined speed.

Each of top surfaces of the first transfer plate 121 and the second transfer plate 131 may be coated with a light-absorbent resin such as Teflon to prevent diffused reflection in the photographing process of the first vision inspection part 150 and the second vision inspection part 170.

The first vision inspection part 150 and the second vision inspection part 170 are respectively disposed above the first transfer plate 121 and the second transfer plate 131 at a predetermined distance to photograph the pellets P transferred through the lanes 122 of the first transfer plate 121 and the second transfer plate 131 so as to detect whether the pellets P are defective. The first vision inspection part 150 and the second vision inspection part 170 acquire the colors, shapes, sizes, and the like of the pellets P with R/G/B/W lightings, for example, using a 12 M/8 Hz camera to inspect defects such as different colors, foreign substances, abnormal shapes, black spots, and the like, to perform image tracking until the pellets P reach the first dispensing part 160 or the second dispensing part 180.

The first dispensing part 160 and the second dispensing part 180 are disposed in front of the first vision inspection part 150 and behind the second vision inspection part 170, respectively. The first dispensing part 160 and the second dispensing part 180 include a plurality of vacuum suction nozzles 161 and 181 arranged in left and right lateral directions above the first transfer plate 121 and the second transfer plate 131. The vacuum suction nozzles 161 and 181 vacuum-suction the pellets P, which move along the lanes 122 of the first transfer plate 121 and the second transfer plate 131. The pellets P determined as being defective are discharged into a separate defective product collection container. A portion of the pellets which are determined as the good products, are discharged into the sample detector 200. Here, since each of the vacuum suction nozzles 161 and 181 is disposed across the plurality of lanes 122, the pellets P that are determined as being defective and the pellets P passing through the lanes 122 around the defective pellets P are vacuum-suctioned together to be discharged. The vacuum suction nozzles 161 and 181 are connected to a vacuum generator such as a known vacuum pump to generate suction force, and the pellets P suctioned through the vacuum suction nozzles 161 and 181 are discharged to the defective product collection container (not shown) or the sample inspector 200 through a flow control valve (not shown) such as a 3-way valve and then are collected.

When the first dispensing part 160 and the second dispensing part 180 suction the pellets P from the first transfer plate 121 and the second transfer plate 131, in order to prevent the pellets P from not being separated from the lanes 122, a plurality of fine ventilation holes 124, each of which has a size less than that of each of the pellets P, are formed to vertically pass through the first transfer plate 121 and the second transfer plate 131 at positions corresponding to the vacuum suction nozzles 161 and 181 of the first dispensing part 160 and the second dispensing part 180, and a discharge auxiliary blower 162 that blows air through the fine ventilation holes 124 is formed below the first transfer plate 121 and the second transfer plate 131 so that, when the process of discharging the defective pellets is performed by the vacuum suction nozzles 161 and 181, the discharge auxiliary blower 162 operates to blow air upward through the fine ventilation holes 124 to help the discharge of the pellets P.

The pellet delivery part 140 is installed substantially vertically with respect to the ground between a front end of the first transfer plate 121 and a front end of the second transfer plate 131 to transfer the pellets P transferred through the first transfer plate 121 downward, thereby performing the turning of the pellets upside down at an angle of 180° while transferring the pellets to a front end of the second transfer plate 131.

In this embodiment, the pellet delivery part 140 includes a first guide plate 141 installed to extend downward from the front end of the first transfer plate 121, a second guide plate 142 installed to be spaced apart by a certain amount greater than a thickness of the pellet P in front of the first guide plate 141, and a plurality of guide lanes 143 formed to extend vertically between the first guide plate 141 and the second guide plate 142 so as to guide the pellets P.

The guide lanes 143 are formed to correspond one-to-one to the lanes 122 of the first transfer plate 121 and the lanes 122 of the second transfer plate 131 so as to deliver the pellets P transferred through the lanes of the first transfer plate 121 to the lanes of the second transfer plate 131.

When the pellets P are transferred to the lanes 122 of the second transfer plate 131 through the guide lane 143, in order to ensure that the pellets P are transferred in the state of being turned upside down at the angle of 180°, the first guide plate 141 and the second guide plate 142 are preferably installed to be inclined at an angle θ3 of 2° to 4° with respect to an axis perpendicular to the ground.

In addition, in order that the pellets P are smoothly delivered from the front end of each of the lanes 122 of the first transfer plate 121 to the guide lane 143 and from a lower end of the guide lane 143 to the lanes 122 of the second transfer plate 131, an upper transfer auxiliary blower 144 that blows air between upper ends of the first guide plate 141 and the second guide plate 142 may be installed above the front end of the first guide plate 141, and a lower transfer auxiliary blower 145 that blows air backward from the front side to push and deliver the pellets transferred from the lower end of the guide lane 143 to the lane of the second transfer plate 131 may be installed at the lower end of the second guide plate 143.

The unloading part is configured to receive the pellets P discharged through the rear end of the second transfer plate 141 of the second pellet transfer part 130 so as to transfer the pellets P to a designated unloading position. In this embodiment, the unloading part includes a good product transfer conveyor 191 that transfers the pellets, which are determined as the good products and are discharged through the rear end of the second transfer plate 131, an emergency discharge conveyor 192 that transfers the pellets, which are determined as being defective and are discharged through the rear end of the second transfer plate 131, and a conveyor moving unit 193 that transfers the good product transfer conveyor 191 and the emergency discharge conveyor 192 to positions corresponding to the rear end of the second transfer plate 131.

The conveyor moving unit 193 includes a movable plate 194 on which the good product transfer conveyor 191 and the emergency discharge conveyor 192 are installed, and an actuator that linearly moves the movable plate 194 by a certain distance, and the movable plate 194 is linearly moved by the actuator to align the good product transfer conveyor 191 or the emergency discharge conveyor 192 with a lower side of the rear end of the second transfer plate 131 so as to receive and transfer the pellets discharged through the rear end of the second transfer plate 131.

The emergency discharge conveyor 192 is configured to process and discharge the entire amount as defective if an emergency situation in which a cumulative sum of scores designated as defective exceeds a certain value as a result of the inspection by the first vision inspection part 150 and the second vision inspection part 170 occurs.

In the process of sorting the defective pellets through the sorter 100, a certain number of good quality pellets are periodically separated and transferred to the sample inspector 200 to manufacture a sample S of a disk-shaped molded product, and then, whether the sample S of the molded product is defective is determined to minimize possibility of defects in the final molded product using the pellets.

The sample inspector 200 includes a pellet storage part 210 that receives and stores the good quality pellets from the first dispensing part 160 or the second dispensing part 180 of the sorter 100, a sample molding part 220 that manufactures the sample of the disk-shaped molded product by heating and pressing a certain amount of pellets supplied from the pellet storage part 210, a cooling part 230 that cools the sample S of the molded product manufactured in the sample molding part 220, a sample inspection part 250 that photographs top and bottoms surfaces of the sample S of the molded product transferred by a sample transfer robot 240 after being cooled by the cooling part 230 to inspect whether the sample S is defective, a marking part 260 that marks a predetermined mark on a surface of the sample inspected by the sample inspection part 250, and a sample unloading stacker 270 that loads the sample S of the molded product, which is marked in the marking part 260.

The pellet storage part 210 is connected to the first dispensing part 160 or the second dispensing part 180 of the sorter 100 to receive and store the pellets, and is configured so that a sensor is installed at one side thereof to automatically supply the pellets to a lower mold 221 of the sample molding part 220 when the pellets reach a certain amount (weight).

The sample molding part 220 includes a lower mold 221 having a cavity receiving a certain amount of pellets from the pellet storage part 210, an upper mold 222 that manufactures the sample of the disk-shaped molded product by pressing the pellets put into the cavity of the lower mold 221, and a heater that melts the pellets by transferring heat to the pellets through the lower mold 221 and the upper mold 222. The heater may be individually installed in each of the lower mold 221 and the upper mold 222.

Each of the lower mold 221 and upper mold 222 of the sample molding part 220 may be provided in plurality to be arranged in a circular shape on an index table 225 that is rotatable at a predetermined angle to manufacture a plurality of samples S of the molded product at regular intervals.

The heater provided in each of the lower mold 221 and the upper mold 222 may be configured by applying a thin plate ceramic heater that is finished with PTFE. The upper mold 222 is installed to rotate vertically around a hinge shaft 223 outside one side of the index table 225 and rotates by an actuator such as a pneumatic cylinder or a hydraulic cylinder to press and mold a pellet material put into the cavity of the lower mold 221.

An index vibration unit (not shown) that vibrates the lower mold 221 is installed so that the pellets are uniformly spread throughout the cavity of the lower mold 221 when the pellets are put into the lower mold 221 from the pellet storage part 210.

In addition, in order to improve a melting rate of the pellets by preheating the pellets when the pellets are put into the lower mold 221 from the pellet storage part 210, a hot air supplier (not shown) that supplies hot air to the lower mold 221 may be additionally installed at one side of the sample molding part 220.

The cooling part 230 that cools the lower mold 221 is configured below one side of the index table 225 of the sample molding part 220. The cooling part 230 is configured to supply a cooling fluid such as air or cooling water to a bottom surface of the lower mold 221 so as to rapidly cool the sample S of the molded product on the lower mold 221.

The sample transfer robot 240 is installed at one side of the sample molding part 220 to vacuum-suction the sample S of the molded product that is molded on the lower mold 221 so as to transfer the sample S to the sample inspection part 250. The sample inspection part 250 includes an inspection table 251 in which a circular opening 252 is formed in a center thereof, and on which an edge portion of the sample S of the molded product is seated on an edge portion of the opening 252, and upper and lower vision inspection cameras 253 and 254 disposed above and below the opening 252 of the inspection table 251 to photograph the top and bottom surfaces of the sample S of the molded product so as to inspect whether the sample S is defective.

A marking part 260 that marks designated marks such as a defective position of the inspected sample S of the molded product, an LOT number of the sample S of the molded product, and a production data and time is installed at one side of the sample inspection part 250.

The sample unloading stacker 270 may be disposed below one side of the sample molding part 220, but its position is not particularly limited. For example, the sample unloading stacker 270 is provided as a cylindrical enclosure having an opened top surface to load the plurality of samples S of the molded product. The transfer of the sample S of the molded product from the marking part 260 to the sample unloading stacker 270 may be performed by the sample transfer robot 240.

Hereinafter, an operation of a system for automatically inspecting and sorting pellets, which has the above-described configuration, will be described.

First, when a plurality of pellets P pass through a hopper 111 of a pellet supply part 110 of a sorter 100, the pellets P are uniformly distributed to both sides through a pellet distribution hole 113 of a distribution plate 112 to drop and be supplied to a rear end of a first transfer plate 121 and then are accommodated in a lane 122 of the first transfer plate 121.

Here, the first transfer plate 121 is excited at a predetermined frequency by a first vibration generator 125 to transfer the pellets accommodated in the lane 122 of the first transfer plate 121 at a predetermined speed forward from a rear side along the lane 122.

A first vision inspection part 150 photographs a first surface (top surface) of the pellets transferred along the lane 122 of the first transfer plate 121 to inspect defects such as different colors, foreign substances, abnormal shapes, black spots, and the like and perform image tracking until the pellets P reach a first dispensing part 160 or a second dispensing part 180.

When the pellet P, which has been inspected by the first vision inspection part 150, reaches a lower side of vacuum suction nozzles 161 of the first dispensing part 160, suction force from the vacuum suction nozzles 161 and 181 is generated on the lane 122, on which the pellet P determined as being defective are disposed, to suction the defective pellets P and the pellets P around the defective pellets P together so as to discharge the pellets into a defective product collection container (not shown).

The pellets P determined as good products passing through the first dispensing part 160 pass through a guide lane 143 between the first guide plate 141 and the second guide plate 142 of the pellet transfer part 140 and then are transferred from a lower end of the guide lane 143 to a lane 122 of the second transfer plate 131 and turned upside down at an angle of 180 degrees so as to be placed on a second surface (bottom surface). That is, since the first transfer plate 121, a pellet delivery part 140, and the second transfer plate 131 are arranged in a '⊏' shape, the pellets P transferred through the first transfer plate 121 are turned upside down while being transferred to the second transfer plate 131.

The pellets P delivered to each lane 122 of the second transfer plate 131 proceed backward from the front side in a line along the lane 122 of the second transfer plate 131 that is excited by a second vibration generator 135. Here, a second vision inspection part 170 photographs the second surface of each of the pellets P from an upper side of the second transfer plate 131 to inspect whether the pellets are defective, and the pellets determined as being defective are suctioned through the vacuum suction nozzles 181 of the second dispensing part 180 and then are discharged into the defective product collection container (not shown).

The good quality pellets transferred to a rear end of the second transfer plate 131 are supplied to and stored in a good product container (not shown) through a good product transfer conveyor 191.

As described above, in a process of sorting the defective pellets and the good quality pellets, the first vision inspection part 150 and the second vision inspection part 170 give scores for the defective pellets, and if a cumulative sum of the scores designated as defective exceeds a certain value, it is determined that the defective products are contained in the entire pellet product, and thus, a conveyor moving unit 193 operates to align an emergency discharge conveyor 192 with the lower side of the rear end of the second transfer plate 131, thereby urgently discharging the entire amount of pellets to the outside through the emergency discharge conveyor 192.

As described above, in the process of sorting the defective pellets and the good quality pellets, some of the pellets determined as the good products by the first vision inspection part 150 and the second vision inspection part 170 are periodically suctioned through the first dispensing part 160 or the second dispensing part 180 so as to be transferred to the pellet storage part 210 of a sample inspector 200.

In the sample inspector 200, when a predetermined amount of pellets (e.g. 20 g) is stored in the pellet storage part 210, a sensor detects the amount of pellets to automatically supply the pellets in the pellet storage part 210 into a cavity of the lower mold 221 aligned at a first position STAGE 1 (S1) of the index table 225 (see FIG. 11). Here, the lower mold 221 is vibrated by an index vibration unit (not shown) to uniformly spread the pellets P, and then, high-temperature hot air is supplied to a hot air supplier (not shown) to preheat the pellets.

Subsequently, the upper mold 222 rotates to heat and press the pellets P while closing the cavity of the lower mold 221. Here, the index table 225 rotates at a certain angle, and the pellets are heated and melted at a temperature of 260° C. to 300° C. by heaters of the lower mold 221 and the upper mold 222 at a second position STAGE 2 (S2) and a third position STAGE 3 (S3), and then, air is blown through the cooling part 230 at a fourth position STAGE 4 (s4) and a fifth position STAGE 5 (S5) to cool the sample S of the molded product molded between the lower mold 221 and the upper mold 222. Here, the sample S of the molded product is cooled to room temperature of about 20° C.

When the lower mold 221 and the upper mold 222 reach a sixth position STAGE 6 (S6) by the rotation of the index table 225, the upper mold 222 rotates to open the cavity, and the sample transfer robot 240 vacuum-adsorb the sample S of the molded product on the lower mold 221 to dispense the sample S so as to be seated on the inspection table 251 of the sample inspection part 250. Subsequently, an upper vision inspection camera 253 and a lower vision inspection camera 254 photograph top and bottom surfaces of the sample S of the molded product to inspect whether the pellets are defective.

When the defective inspection of the sample S of the molded product is completed, the sample transfer robot 240 vacuum-adsorbs the sample S of the molded product on the inspection table 251 to transfers the sample S to the marking part 260. The marking part 260 marks a designated mark such as a defective position on a surface of the sample S of the molded product, a LOT number of the sample S of the molded product, and a production date and time.

When the marking is completed, the sample transfer robot 240 vacuum-adsorbs the sample S of the molded product of the marking part 260 to transfer the sample S to a sample unloading stacker 270 so as to load the sample.

As described above, in the system for automatically inspecting and sorting the pellets according to an embodiment of the present invention, the colors and images of both the surfaces of the pellets may be acquired while the pellets are continuously transferred at the high speed in the sorter to detect the defects such as the different colors, the foreign substances, the abnormal shapes, and the dark spots, and the like, thereby removing the pellets that are determined as being defective while transferring the pellets. Therefore, accuracy and efficiency of inspecting and sorting the pellets may be greatly improved.

In addition, the sample S of the molded product may be periodically manufactured for the pellets that are determined and classified as the good product in the sorter 100 to detect whether the manufactured sample S of the molded product is defective, thereby predicting and handling the accuracy of the sorting in the sorter and the possibility of the defects in the final product.

In the above, the present technology has been described in detail with reference to the embodiments, but those skilled in the art to which the present invention belongs will be able to make various substitutions, additions, and modifications without departing from the technical idea described above. Of course, it should be understood that such modified embodiments also belong to the protection scope of the present invention, which is defined by the appended claims below.

INDUSTRIAL APPLICABILITY

Embodiments of the present invention may be applied to an apparatus for inspecting and sorting whether pellets, which are solid particles of a synthetic resin that is used in various fields such as films, pipes, automobile interior materials, and the like, are defective.

The invention claimed is:

1. A system for automatically inspecting and sorting pellets, the system comprising:

a pellet supply part configured to supply a plurality of pellets;

a first pellet transfer part configured to transfer the plurality of pellets supplied from the pellet supply part along a conveyance path toward a pellet delivery part;

the pellet delivery part disposed after the first pellet transfer part along the conveyance path, the pellet delivery part being configured to transfer the plurality of pellets received from the first pellet transfer part downward;

a second pellet transfer part disposed below the first pellet transfer part, wherein the second pellet transfer part is configured to receive the plurality of pellets transferred downward through the pellet delivery part, wherein the second pellet transfer part is configured to invert the plurality of pellets by 180°, so as to transfer the plurality of pellets in a direction away from the pellet delivery part along the conveyance path;

a first vision inspection part disposed above the first pellet transfer part, the first vision inspection part being configured to photograph a first surface of each of the plurality of pellets, so as to inspect whether the first surface of each of the plurality of pellets is defective;

a first dispensing part disposed between the first vision inspection part and the pellet delivery part, wherein the first dispensing part is configured to suction defective ones of the plurality of pellets, wherein the first vision inspection part is configured to determine a defect of each of the plurality of pellets, so as to separate the defective pellets from the first pellet transfer part;

a second vision inspection part disposed above the second pellet transfer part, the second vision inspection part being configured to photograph a second surface of each of the plurality of pellets so as to inspect whether the second surface of each of the plurality of pellets is defective;

a second dispensing part disposed after the second vision inspection part along the conveyance path, wherein the second dispensing part is configured to suction the plurality of defective pellets, wherein the second vision inspection part is configured to determine a defect of the second surface of each of the plurality of pellets, so as to separate the defective pellets from the second pellet transfer part; and an unloading part disposed after the second pellet transfer part along the conveyance path, wherein the unloading part is configured to receive the plurality of pellets from the second pellet transfer part, so as to transfer the plurality of pellets to a designated unloading position, wherein the pellet delivery part comprises:

a first guide plate extending downward from a front end of a first pellet transfer part;

a second guide plate installed to be spaced apart in a horizontal dimension from the first guide plate by a certain amount, the certain amount being greater than a thickness of each of the plurality of pellets; and a plurality of guide lanes disposed to extend vertically between the first guide plate and the second guide plate, so as to guide the plurality of pellets downward.

2. The system of claim 1, wherein the first pellet transfer part comprises:

a first transfer plate inclined downward at a predetermined angle toward the pellet delivery part, wherein the first transfer plate includes a plurality of lanes along which the plurality of pellets are configured to move; and a first vibration generator configured to vibrate the first transfer plate at a predetermined frequency, wherein the second pellet transfer part comprises:

a second transfer plate inclined downward at a predetermined angle away from the pellet delivery part, wherein the second transfer plate includes a plurality of lanes, so as to accommodate movement of the plurality of pellets; and a second vibration generator configured to vibrate the second transfer plate at a predetermined frequency.

3. The system of claim 2, wherein each of a top surfaces of the first transfer plate and a top surface of the second transfer plate is coated with a light-absorbent resin, the light-absorbent resin being configured to prevent diffused reflection in a photographing process of the first vision inspection part and the second vision inspection part.

4. The system of claim 1, wherein the pellet supply part comprises:

a hopper including an input port, the input port being configured to receive the plurality of pellets; and at least one distribution plate disposed below the hopper, wherein the at least one distribution plate includes a plurality of pellet distribution holes, the plurality of pellet distribution holes being configured to allow passage of the plurality of pellets.

5. The system of claim 1, wherein each of the first dispensing part and the second dispensing part comprise a plurality of vacuum suction nozzles extending transverse to the conveyance path and above the first pellet transfer part and the second pellet transfer part, respectively, wherein the plurality of vacuum suction nozzles are configured to suction the plurality of defective pellets, wherein the plurality of defective pellets are configured to be moved along the first pellet transfer part and the second pellet transfer part, wherein the plurality of vacuum suction nozzles are configured to suction the plurality of pellets in an area around the plurality of defective pellets, so as to discharge both the plurality of defective pellets and a portion of the plurality of pellets that are not defective.

6. The system of claim 5, wherein a plurality of fine ventilation holes are disposed in the first pellet transfer part and the second pellet transfer part, wherein each of the plurality of fine ventilation holes has a size smaller than that of each of the plurality of pellets, wherein the plurality of fine ventilation holes are further disposed in a position corresponding to the plurality of vacuum suction nozzles, and a first and a second discharge auxiliary blower configured to blow air through the plurality of fine ventilation holes, wherein the first discharge auxiliary blower is disposed below the first pellet transfer plat-part and the second discharge auxiliary blower is disposed below the second pellet transfer part, so as to blow air upward through the plurality of fine ventilation holes to help the discharge of the plurality of defective pellets.

7. The system of claim 1, further comprising:

an upper transfer auxiliary blower configured to blow air downward between the first guide plate and the second guide plate, the upper transfer auxiliary blower being disposed above the front end of the first pellet transfer part; and a lower transfer auxiliary blower configured to blow air in the direction away from the pellet delivery part, so as to push the plurality of pellets transferred from a lower end of the second guide plate to the second pellet transfer part.

8. The system of claim 1, wherein the first guide plate and the second guide plate are inclined at an angle of 2° to 4° with respect to an axis perpendicular to the horizontal dimension.

9. The system of claim 1, wherein the unloading part comprises:

a good product transfer conveyor configured to discharge the plurality of pellets determined not to be defective pellets via a rear end of the second transfer plate, the rear end of the second transfer plate facing in the direction away from the pellet delivery part;

an emergency discharge conveyor configured to discharge the plurality of defective pellets, via the rear end of the second transfer plate; and a conveyor moving unit configured to move the good product transfer conveyor and the emergency discharge conveyor to positions corresponding to the rear end of the second transfer plate.

10. The system of claim 1, further comprising a sample inspector configured to receive the plurality of pellets, wherein the first vision inspection part and the second vision inspection part are configured to determine whether the plurality of pellets are not defective pellets, wherein the sample inspector is configured to receive the plurality of pellets at regular intervals from the first dispensing part or from the second dispensing part, so as to manufacture a plate-shaped sample of a molded product, wherein the sample inspector is configured to inspect the plate-shaped sample for defects.

11. The system of claim 10, wherein the sample inspector comprises:

a pellet storage part configured to receive the plurality of pellets from the first dispensing part or from the second dispensing part;

a sample molding part comprising a lower mold, the lower mold including a cavity configured to receive a certain amount of pellets from the pellet storage part, an upper mold configured to press the certain amount of pellets into the cavity of the lower mold, so as to manufacture the plate-shaped sample, and a heater configured to transfer heat to the certain amount of pellets through the lower mold and the upper mold, so as to melt the pellets;

a cooling part configured to cool the plate-shaped sample;

a sample transfer robot configured to transfer the plate-shaped sample cooled by the cooling part;

a sample inspection part configured to photograph a top surface of the plate-shaped sample and a bottoms surface of the plate-shaped sample, so as to inspect the plate-shaped sample is defective;

a marking part configured to mark a predetermined mark on a top surface or a bottom surface of the plate-shaped sample, wherein the sample inspection part is configured to inspect the plate-shaped sample; and a sample unloading stacker configured to load the plate-shaped sample.

12. The system of claim 11, wherein the sample molding part further comprises:

an index table configured to be rotatable and is disposed at a predetermined angle with respect to an axis perpendicular to a longitudinal dimension of the system, wherein the index table includes a plurality of lower molds and a plurality of upper molds disposed at certain intervals, wherein the plurality of upper and lower molds are disposed about a central axis of the index table in a circumferential dimension; and an index vibration unit configured to vibrate the lower mold.

13. A system for automatically inspecting and sorting pellets, the system comprising:

a sorter configured to photograph and inspect a first surface of each of a plurality of pellets and a second surface of each of the plurality of pellets while transferring the plurality of pellets, so as to separate and remove defective ones of the plurality of pellets, wherein the sorter is configured to determine which of the plurality of pellets is defective, wherein the sorter is configured to transfer and load the plurality of pellets not determined to be defective to a designated position; and a sample inspector configured to receive the plurality of pellets not determined to be defective, so as to manufacture a plate-shaped sample of a molded product, wherein the sample inspector is configured to photograph a first surface of the plate-shaped sample and a second surface of the plate-shaped sample, in inspecting whether the plate-shaped sample is defective, wherein the sorter comprises:

a pellet supply part configured to supply the plurality of pellets;

a first pellet transfer part configured to transfer the plurality of pellets supplied from the pellet supply part along a conveyance path toward a pellet delivery part;

the pellet delivery part disposed after the first pellet transfer part along the conveyance path, the pellet delivery part being configured to transfer the plurality of pellets received from the first pellet transfer part downward;

a second pellet transfer part disposed below the first pellet transfer part, wherein the second pellet transfer part is configured to receive the plurality of pellets transferred downward through the pellet delivery part, and wherein the second pellet transfer part is configured to invert the plurality of pellets by 180°, so as to transfer the plurality of pellets in a direction away from the pellet delivery part along the conveyance path;

a first vision inspection part disposed above the first pellet transfer part, the first vision inspection part being configured to photograph a first surface of each of the plurality of pellets so as to inspect whether the first surface of each of the plurality of pellets is defective;

a first dispensing part disposed between the first vision inspection part and the pellet delivery part, wherein the first dispensing part is configured to suction and discharge defective ones of the plurality of pellets transferred by the first pellet transfer part;

a second vision inspection part disposed above the second pellet transfer part, the second vision inspection part being configured to photograph a second surface of each of the plurality of pellets so as to inspect whether the second surface of each of the plurality pellets is defective;

a second dispensing part disposed after the second vision inspection part along the conveyance path, wherein the second dispensing part is configured to suction defective ones of the plurality of pellets transferred by the second pellet transfer part; and an unloading part disposed after the second pellet transfer part along the conveyance path, wherein the unloading part is configured to receive the plurality of pellets from the second pellet transfer part, so as to transfer the plurality of pellets to a designated unloading position, wherein the pellet delivery part comprises:

a first guide plate extending downward from a front end of a first transfer plate;

a second guide plate installed to be spaced apart in a horizontal dimension from the first guide plate by a certain amount, the certain amount being greater than a thickness of each of the plurality of pellets; and a plurality of guide lanes disposed to extend vertically between the first guide plate and the second guide plate, so as to guide the plurality of pellets downward.

14. The system of claim 13, wherein the sample inspector comprises:

a pellet storage part configured to receive the plurality of pellets from the first dispensing part or from the second dispensing part, so as to store the plurality of pellets;

a sample molding part comprising a lower mold, the lower mold including a cavity configured to receive a certain amount of pellets from the pellet storage part, an upper mold configured to press the certain amount of pellets into the cavity of the lower mold, so as to manufacture a plate-shaped sample of a molded product, and a heater configured to transfer heat to the certain amount of pellets through the lower mold and the upper mold, so as to melt the pellets;

a cooling part configured to cool the plate-shaped sample;

a sample transfer robot configured to transfer the plate-shaped sample cooled by the cooling part;

a sample inspection part configured to photograph a top surface of the plate-shaped sample and a bottom surface of the plate-shaped sample, so as to inspect whether the plate-shaped sample is defective;

a marking part configured to mark a predetermined mark on a top surface or a bottom surface of the plate-shaped sample, wherein the sample inspection part is configured to inspect the plate-shaped sample; and a sample unloading stacker configured to load the plate-shaped sample.

15. The system of claim 14, wherein the sample molding part comprises:

an index table configured to be rotatable and disposed at a predetermined angle with respect to an axis perpendicular to a longitudinal dimension of the system, wherein the index table includes a plurality of lower molds and a plurality of upper molds at certain intervals, wherein the plurality of upper and lower molds are disposed about a central axis of the index table in a circumferential dimension; and an index vibration unit configured to vibrate the lower mold.

* * * * *